United States Patent [19]
Crouse

[11] Patent Number: 5,134,627
[45] Date of Patent: Jul. 28, 1992

[54] BATCH CHARGER FOR GLASS FURNACE

[75] Inventor: Clifford F. Crouse, Washington, Pa.

[73] Assignee: Frazier-Simplex, Inc., Washington, Pa.

[21] Appl. No.: 656,571

[22] Filed: Feb. 15, 1991

[51] Int. Cl.$^5$ .............................................. C03B 3/00
[52] U.S. Cl. ........................................ 373/33; 373/27; 373/28; 65/27; 65/335; 414/166
[58] Field of Search ................ 373/33, 40, 41, 28, 373/27; 65/27, 335, 134, 19, 163, 135; 414/173, 198, 166

[56] References Cited

U.S. PATENT DOCUMENTS

| | | | |
|---|---|---|---|
| 1,483,278 | 2/1924 | Carey | 65/335 |
| 1,917,247 | 7/1933 | Good | 65/335 |
| 3,780,889 | 12/1973 | Frazier et al. | 214/33 |
| 4,036,625 | 7/1977 | Holmes et al. | 65/134 |
| 4,197,109 | 4/1980 | Frazier et al. | 65/335 |
| 4,264,351 | 4/1981 | Pieper | 65/335 |
| 4,328,019 | 5/1982 | Dejaiffe et al. | 65/19 |
| 4,545,717 | 10/1985 | Wittler et al. | 414/166 |
| 4,854,959 | 8/1989 | Waltert | 65/335 |
| 4,983,206 | 1/1991 | Trunzo | 65/335 |

Primary Examiner—Geoffrey S. Evans
Assistant Examiner—Tu Hoang
Attorney, Agent, or Firm—Webb, Burden, Ziesenheim & Webb

[57] ABSTRACT

A batch charger for feeding raw batch material to a glass making furnace of the type having a reciprocating charger plate positioned under a hopper chute. A pusher bar is supported substantially parallel to the front edge of the charger plate, and rams are connected to the pusher bar to move it from a position under the charger plate such that raw batch that has been delivered over the edge of the charger plate can be pushed further into the furnace.

10 Claims, 3 Drawing Sheets

BATCH CHARGER FOR GLASS FURNACE

BACKGROUND OF THE INVENTION

The present invention relates generally to a charging apparatus for introducing raw materials into a glass melting furnace and, more particularly, to socalled blanket batch chargers of the type disclosed in U.S. Pat. Nos. 3,780,889; 4,197,109 and U.S. Pat. No. 4,983,206, all commonly owned with the present application.

A continuous furnace used for the manufacture of glass typically comprises a large rectangular tank in which the molten bath of glass is contained. A raw batch mixture is continuously introduced into the furnace by batch charging apparatus of the type mentioned above. At the charging end of the furnace, the batch material is first melted in a melting zone, proceeds to a central zone, and then to a forehearth region where the molten glass is removed for formation into the desired finished product, such as flat glass or other shapes. The quality of the glass product is largely dependent upon the uniformity of the melt.

Furnace efficiency may vary considerably, depending upon the rate of batch feeding and the manner in which the raw batch material is introduced into the furnace. The charging end of the glass furnace typically includes a structure having a charging bay generally referred to in the art as the "doghouse". This furnace structure includes a suspended wall set inwardly from a lower rear wall of the charging bay, leaving an open or semiopen trough therebetween, defining the so-called doghouse across a substantial part of the full width of the furnace. This width varies, and in present furnace structures, can be on the order of 20 to 30 feet in width.

The doghouse provides a downwardly extending open area above the level of the molten glass into which the mixture of glass forming ingredients, or raw batch, is charged. The raw batch material initially floats on the molten glass and melts as it moves forward into the furnace. The batch charger disclosed in U.S. Pat. No. 4,983,206 has a charger plate that downwardly extends into the exposed area of the doghouse and reciprocates in a direction along the long axis of the furnace. The charger plate is positioned beneath a hopper chute such that as the charger plate moves forward from a retracted limit of travel, raw batch material from the hopper chute is deposited in a layer on the charger plate.

As the charger plate moves rearwardly, the layer of batch material then residing on the charger plate is obstructed by a seal device at the rear of the hopper from being carried rearwardly and therefore a row or "log"0 of charge is moved off the charger plate to fall over the nose of the charger plate onto the bath in the open area of the furnace from which the previous charge has just been cleared. This reciprocating cycle may be continuously repeated to maintain a substantially constant level of molten glass in the furnace as the melt is removed at the forehearth region.

Depending upon the rate of reciprocation, the nose or forward edge of the charger plate, just prior to depositing a new "log" of charge on the bath, may push a previously deposited "log" floating on the bath toward or under the suspended wall at the end of the doghouse into the melting zone of the furnace.

It has been observed that continuous melting furnaces of identical construction may exhibit unpredictable variations in performance due to eddy currents, convective currents, flame flow and other factors which influence the quality of the glass and fuel consumption or efficiency in the furnace. It has also been observed that a change in the feeding of the batch material results in a noticeable change in fuel efficiency. Because of the individuality of each furnace and the drift in melting conditions over periods of time, it is often necessary to adjust the batch feeder characteristics from time to time to improve furnace performance.

The final glass quality is dependent upon the quantity and placement of the raw batch material charged into the furnace with each reciprocating stroke of the charger plate. The adjustment of the stroke, while facilitated by the invention set forth in U.S. Pat. No. 4,983,206, is not an adjustment that can be made without discontinuing reciprocation for some short period of time.

It is thus desirable to be able to position the raw material logs as they are laid down on the top of the batch beyond the positioning that was available by simply adjusting the length of the stroke of the charger plates as with prior batch chargers of this type.

SUMMARY OF THE INVENTION

Briefly, the present invention provides an improved batch charger for a glass furnace. The batch charger includes a main support frame, preferably carrying a plurality of wheeled truck assemblies for travel on floor-mounted rails in a direction into and away from the glass furnace. A charger plate is provided having a plurality of spaced-apart bearing tracks transversely extending on the underside thereof for reciprocal travel on respective sets of wheeled rollers fixed relative to the frame and positioned therebeneath. A charger plate crank assembly is attached to the charger plate via a connecting rod or the like and may be variably set to a reciprocating distance of from one to twelve inches, for example. A hopper is positioned over the charger plate for delivering charge to the charger plate. A seal is provided behind the opening from the hopper to the charger plate to push the layer of charge along the charger plate when the charger plate is retracted. The edge of the charger plate over which the charge is delivered to the furnace is water cooled. The batch charger so far described is known.

It is an improvement, according to this invention, to provide a pusher bar associated with the charger for pushing the charge further away from the charger onto the molten glass bath. Preferably, the pusher bar is normally positioned along and just below the front edge of the charger plate. The pusher bar must be cooled as by water passing through the interior of a hollow bar. According to one embodiment, the pusher bar is supported by rods extending along the underside of the charger plate and being slidably journaled relative to the charger plate so that they can reciprocate in the same direction that the charger plate reciprocates. The pusher bar is carried by the ends of the support rods.

Also mounted to the bottom of the charger plate are hydraulic rams (pistons and cylinders) arranged so that they expand in the direction of reciprocation of the charger plate. The rams are secured directly or through extension rods on one end to the charger plate and on the other end to the pusher bar. The expansion of the hydraulic rams extends the pusher bar out away from the front edge of the charger plate. Suitable flexible conduits are arranged to carry cooling fluid to the hollow pusher bar. Most preferred, the slidably journaled bars are hollow pipes, the interiors of which are in open communication with the interior of the hollow pusher bar. In this case, the flexible conduits are in communication with the rearward ends of the hollow pipes.

Flexible hydraulic conduits are also in communication with the rams to pressurize the rams for expansion and compression. The rams must be controlled to move out away from the charger plate only when the charger plate is moving forward or when the charger plate is in its extreme positions. The pusher bar must be in its full retracted position when the charger plate begins its rearward movement. In this way, the pusher bar will not interfere with the delivery of the charge during the retraction of the charger plate dumping charge over its front edge. According to this preferred embodiment, the cooled pusher bar is pulled into contact with the front edge of the charger plate to provide a heat sink for the edge of the charger plate.

According to an alternate embodiment of this invention, the pusher bar is supported from the main support frame and not from the charger plate. In this embodiment, the rods supporting the pusher bar are slidably journaled relative to the main support frame.

BRIEF DESCRIPTION OF THE DRAWINGS

Further features and other objects and advantages will become apparent from the following detailed description made with reference to the drawings in which.

DETAILED DESCRIPTION OF THE INVENTION

Figure 1:
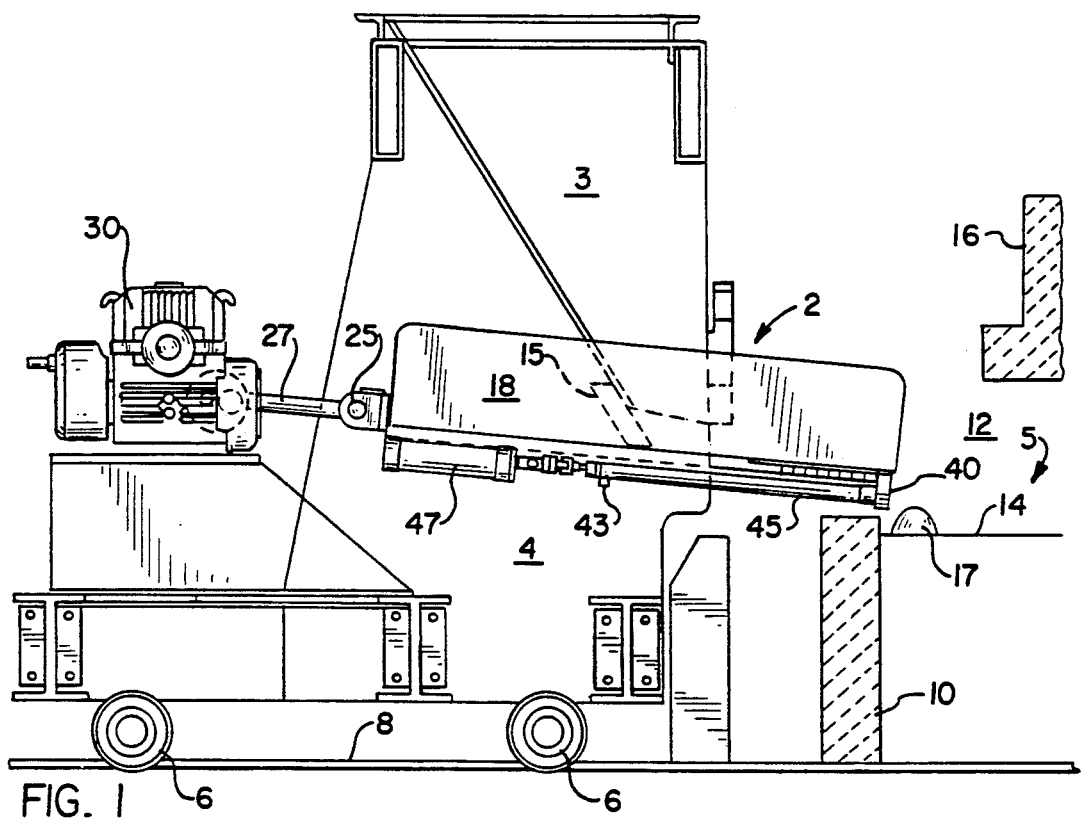
FIG. 1 is a side elevation view of a batch charger of the present invention positioned adjacent a charging end of a glass furnace.
Figure 2:
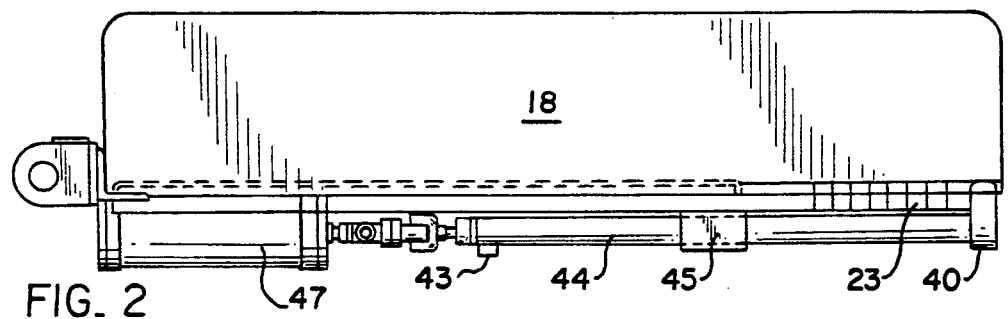
FIG. 2 is a side view of the charger plate and pusher bar assembly for the batch charger shown in FIG. 1.
Figure 3:
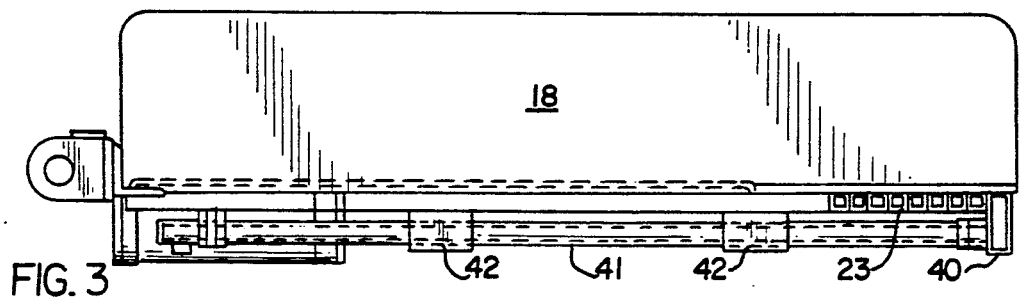
FIG. 3 is a section view of the charger plate and pusher bar assembly taken along line III—III in FIG. 4.
Figure 5:
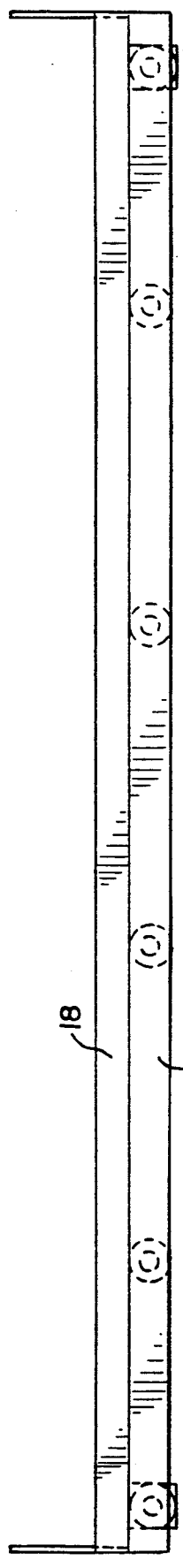
FIG. 5 is a front edge view of the charger plate and pusher bar assembly for the batch charger shown in FIG. 1.
Figure 4:
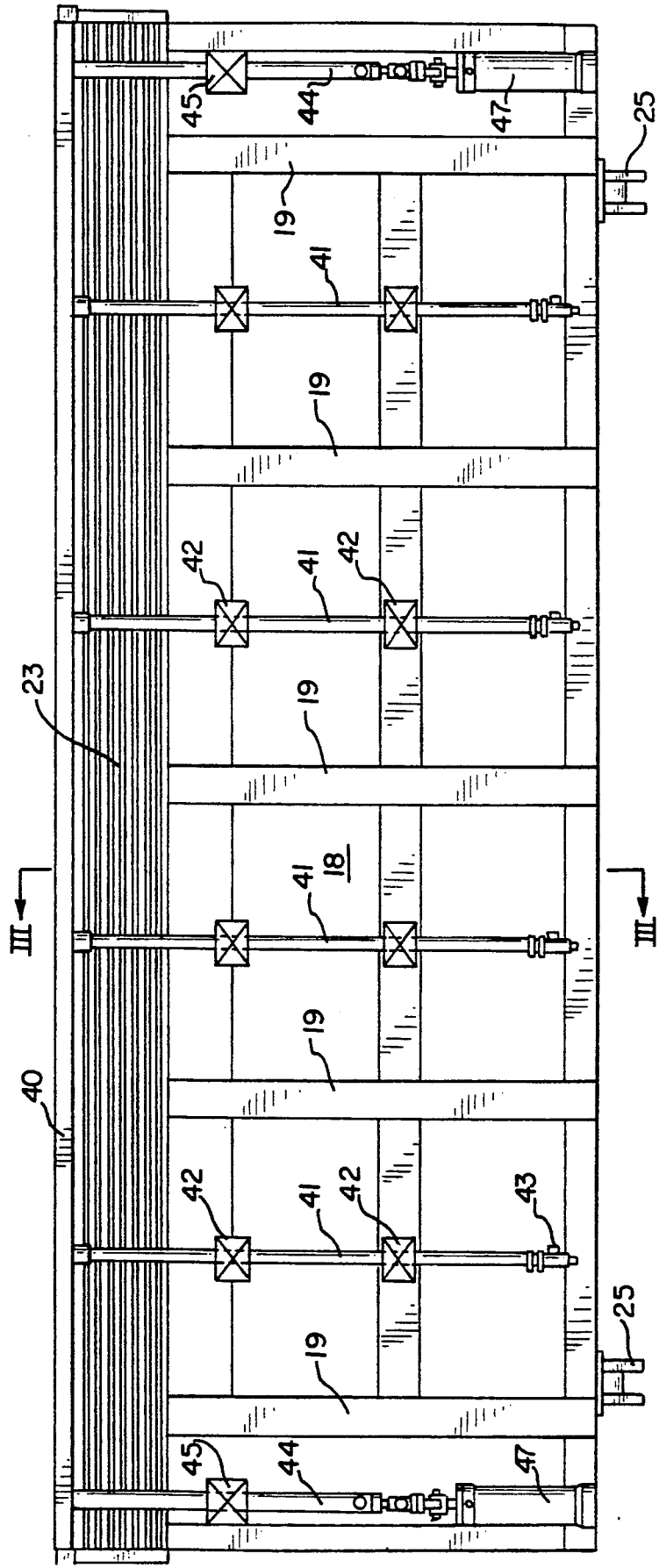
FIG. 4 is a bottom view of the charger plate and pusher bar assembly for the batch charger shown in FIG. 1.

With reference to FIG. 1, the batch charger of the invention, generally designated 2, is shown adjacent a charging end of glass furnace 5. A typical glass furnace includes a suspended rear wall 16 spaced inwardly from a lower stationary wall 10 which, at that end, confines the batch of molten glass and defines a so-called "doghouse" area 12 where the charging of the raw batch materials takes place as is known in machines of this type. As is conventional in feeders of this type, raw batch is placed in a hopper chute 3 which is supported by the framing structure 6 of the feeder 4. As the reciprocating charger plate 18 moves rearwardly, a seal device 15 prevents rearward passage of the raw batch material present on the charger plate, causing a charge 17 of raw batch material to fall off of the nose of the charger plate, as is conventional in batch chargers of this type. Charges 17 of raw batch material are, thus, delivered by the charger plate 18 to the surface 14 of the molten glass in the doghouse area 12. As successive charges 17 are placed onto the molten glass surface, the earlier placed charges are gradually pushed inwardly to the melting zone of the furnace whereupon the charge melts into the glass bath.

The batch charger 2 includes a supporting base or frame structure 4 mounted on wheeled truck assemblies 6, as is conventional with machines of this type, for travel on floor-mounted rails 8 toward and away from the rear wall 10 of the glass furnace 5. When in operation, the charger 2 is positioned adjacent to the glass furnace 5, as shown in FIG. 1.

The charger plate 18 of the invention includes a pair of side walls. A typical charger plate 18 is on the order of about 10 to 15 feet or more in length, providing, when paired, an overall charger length of upwards of 30 feet or more. Referring to FIGS. 1 to 4, the charger plate includes a water-cooled nose portion having water piping 23 provided at the exterior to permit the circulation of cooling water therein which permits the charger plate to withstand the elevated temperatures at the doghouse area 12 of the glass furnace. The rear edges of the charger plates carry outwardly extending apertured lugs 25 which pivotally connect to the ends of reciprocating connecting rods 27 of the adjustable crank assemblies 30. The bottom surfaces of each of the charger plates have a plurality of transversely extending, spaced-apart bearing tracks or surfaces 19 (FIG. 4) affixed thereto, which bear against spaced sets of rollers (not shown). In this manner, charger plate 18 reciprocally moves on the rollers in response to the movement of the connecting rods 27.

The pusher bar 40 may be a hollow structure with a rectangular cross section. Other cross sections would be acceptable. Preferably, the side of the bar that contacts the charge as it is being advanced over the surface of the glass melt is flat and generally vertical. The pusher bar is supported from the charger plate by a plurality of rods 41 which are slidably held by bearings 42 mounted to the underside of the charger plate. Preferably, the rods are hollow pipes in open communication with the hollow pusher bar. Fittings 43 at the end of the rods 41 enable the connection of flexible conduits for carrying cooling fluid to and from the pusher bar.

At the outer edges of the charger plate, rods 44 are slidably held by bearings 45. The rods 44 are also connected to hydraulic rams 47. The rams are supplied with hydraulic power so as to act in unison to move the pusher bar 40 in and out relative to the charger plate 18. The rods 44 can also be hollow and water cooled.

Figure 6:
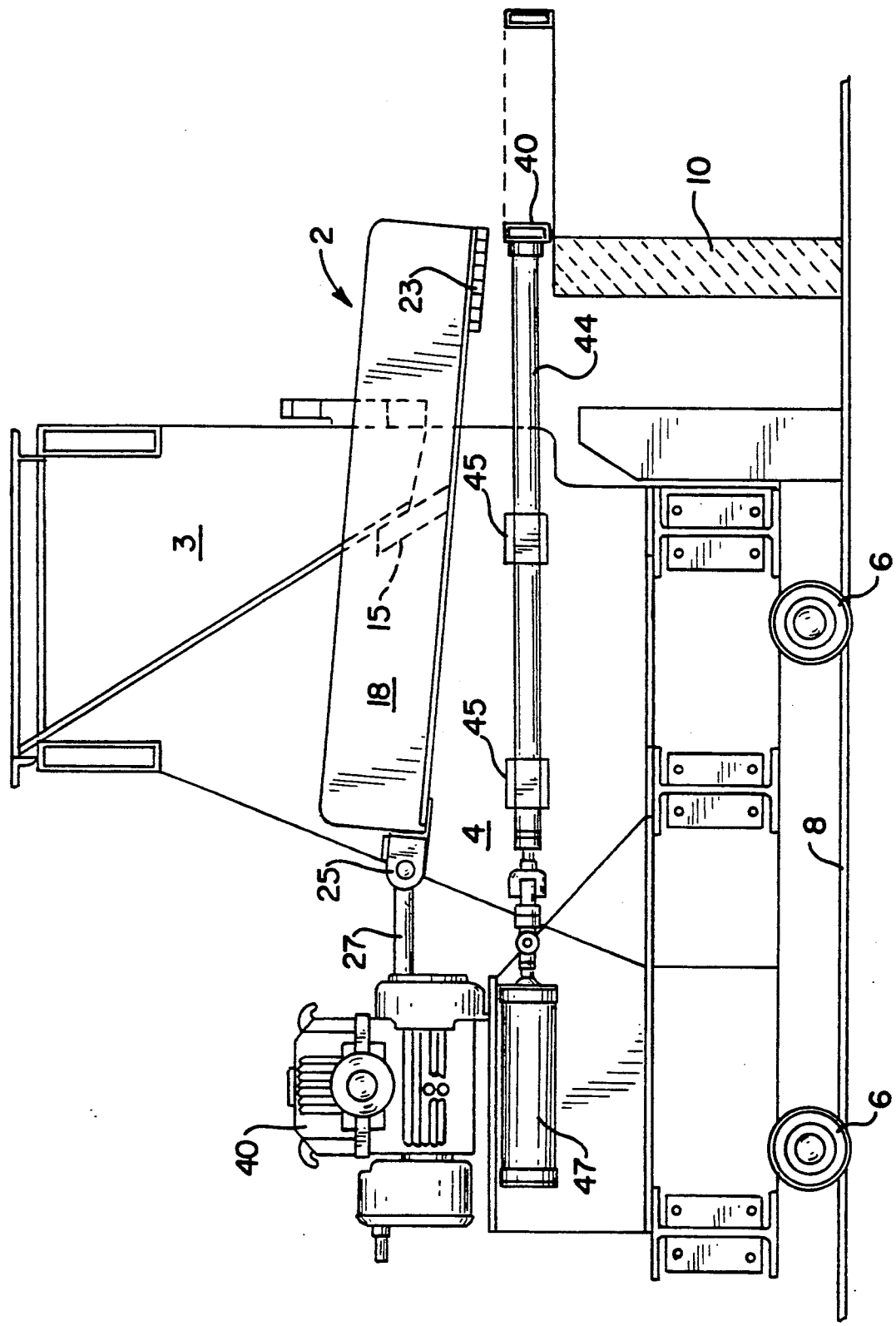
FIG. 6 is a side elevation view of an alternate embodiment of a batch charger according to the present invention.

Referring now to FIG. 6, an alternate embodiment is described. The numerals on FIG. 6 correspond to those used on the preceding figures. The main difference between the embodiment as illustrated in FIGS. 1 to 5 and this embodiment is that the pusher bar is not supported from the underside of the charger plate but is supported from the main frame 4. In other words, support rods 44 are slidably journaled to the main frame by bearings 45. The rams 47 for actuating the pusher bar are connected at one end to the frame and at the other end directly or indirectly to the pusher bar. The cooling system 23 for the charger plate must extend entirely to the front edge of the charger plate since the pusher rod cannot serve to cool the edge of the plate as with the embodiment of FIG. 1.

OPERATION

In operation, the reciprocating plate moves forward into the doghouse and then backward. As it moves forward, the surface of the plate is filled with raw batch material. As it moves backward, raw batch material is pushed over the edge of the charger plate depositing a row or "log" of material on the surface of the glass bath. After the rearward movement of the lower plate has ceased and any time up until the next rearward stroke begins, the pusher rod may be extended out away from under the edge of the charger plate to advance the row or log over the surface of the glass bath.

Having thus defined my invention with the particularity required by the Patent Laws, what is desired protected by Letters Patent is set forth in the following claims.

I claim:

1. A batch charger for feeding raw batch material to a glass making furnace of the type having a main support frame with raw batch hopper chute therein, and a reciprocating charger plate positioned under the hopper chute for receiving raw batch material therefrom, the improvement comprising:

a pusher bar movable with respect to said charger plate, means to support the pusher bar substantially parallel to a front edge of the charger plate, and means to cause the pusher bar to move from a first position under the charger plate to a second position spaced from the front edge of the charger plate whereby raw batch that has been delivered over the edge of the charger plate can be pushed further into the furnace.

2. The improvement according to claim 1 wherein the means to support the pusher bar is supported from an underside of the charger plate.

3. The improvement according to claim 2 wherein the pusher bar is supported by a plurality of rods slidably journaled to the underside of the charger plate.

4. The improvement according to claim 3 wherein the pusher bar has a hollow interior and the rods supporting the pusher bar are hollow and in fluid communication with the interior of the pusher bar whereby cooling fluid can be circulated through the rods and pusher bar.

5. The improvement according to claim 1 wherein the means to cause the pusher bar to move comprise hydraulic rams connected at one end to the charger plate and at the other end to the pusher bar.

6. The improvement according to claim 1 wherein the means to cause the pusher bar to move is controlled to permit the movement of the pusher bar from the first position to the second position only when the charger plate is at an outermost position and when the charger plate is moving forward.

7. The improvement according to claim 1 wherein the pusher bar is supported by a plurality of rods slidably journaled to the main support frame.

8. The improvement according to claim 7 wherein the pusher bar has a hollow interior and the rods supporting the pusher bar are hollow and in fluid communication with the interior of the pusher bar whereby cooling fluid can be circulated through the rods and pusher bar.

9. The improvement according to claim 7 wherein the means to cause the pusher bar to move comprise hydraulic rams connected at one end to the main support frame and at the other end to the pusher bar.

10. The improvement according to claim 9 wherein the means to cause the pusher bar to move is controlled to permit the movement of the pusher bar from the first position only when the charger plate is at an outermost position and when the charger plate is moving forward.

* * * * *

UNITED STATES PATENT AND TRADEMARK OFFICE
CERTIFICATE OF CORRECTION

PATENT NO. : 5,134,627

DATED : July 28, 1992

INVENTOR(S) : Clifford F. Crouse

It is certified that error appears in the above-identified patent and that said Letters Patent is hereby corrected as shown below:

Column 1 Line 7 "socalled" should read --so-called--.

Column 1 Line 53 before "of" delete --0--.

Column 3 Line 58 delete "6".

Column 3 Line 60 "!5" should read --15--.

Claim 10 Line 33 Column 6 after "position" insert --to the second position--.

Signed and Sealed this

Thirty-first Day of August, 1993

*Attest:*

*Attesting Officer*

BRUCE LEHMAN

Commissioner of Patents and Trademarks